(12) United States Patent
Park

(10) Patent No.: US 7,231,529 B2
(45) Date of Patent: Jun. 12, 2007

(54) METHOD OF CONTROLLING POWER TO AN AUXILIARY SYSTEM COMPRISING A DISPLAY PART AND A WIRELESS SENDING/RECEIVING PART CONNECTED TO A PORTABLE COMPUTER THROUGH A MOUNTING PART

(75) Inventor: Seong-geun Park, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 402 days.

(21) Appl. No.: 10/820,813

(22) Filed: Apr. 9, 2004

(65) Prior Publication Data

US 2005/0005176 A1 Jan. 6, 2005

(30) Foreign Application Priority Data

Jul. 1, 2003 (KR) ............... 10-2003-0044389

(51) Int. Cl.
*G06F 1/00* (2006.01)
*G06F 1/32* (2006.01)
*H05K 7/00* (2006.01)

(52) U.S. Cl. ............... 713/300; 713/320; 361/686

(58) Field of Classification Search ............... 713/300, 713/320, 723; 361/683, 686
See application file for complete search history.

(56) References Cited

U.S. PATENT DOCUMENTS 5,307,055 A 4/1994 Baskin et al.
5,471,621 A * 11/1995 Ohtsuki ............... 713/323
6,178,087 B1 * 1/2001 Cho et al. ............... 361/686
6,392,871 B1 5/2002 Yanase
6,535,199 B1 * 3/2003 Canova et al. ............... 345/168
6,798,647 B2 * 9/2004 Dickie ............... 361/683

FOREIGN PATENT DOCUMENTS

| JP | 9-26832 | 1/1997 |
| JP | 11-175187 | 7/1999 |
| KR | 1994-009735 | 5/1994 |
| KR | 1996-0011644 | 4/1996 |
| KR | 1999-0030851 | 5/1999 |
| KR | 2002-065779 | 8/2002 |

\* cited by examiner

*Primary Examiner*—Thomas Lee
*Assistant Examiner*—Suresh K Suryawanshi
(74) *Attorney, Agent, or Firm*—Staas & Halsey LLP

(57) ABSTRACT

A portable computer system and method include an auxiliary system including a first wireless sending/receiving part; and a main system including a data storing part storing data, a second wireless sending/receiving part, a mounting part mounting the auxiliary system thereto, and a mounting sensing part sensing whether the auxiliary system is mounted on the mounting part, where when displaying the data of the main system on a display part, the main system transmits the data stored in the data storing part to the auxiliary system to process and to display the data on the display part, and when not displaying the data on the display part, the main system supplies a signal to the switching part to cut-off electric power to the auxiliary system through the mounting part or the first wireless sending/receiving part.

31 Claims, 5 Drawing Sheets

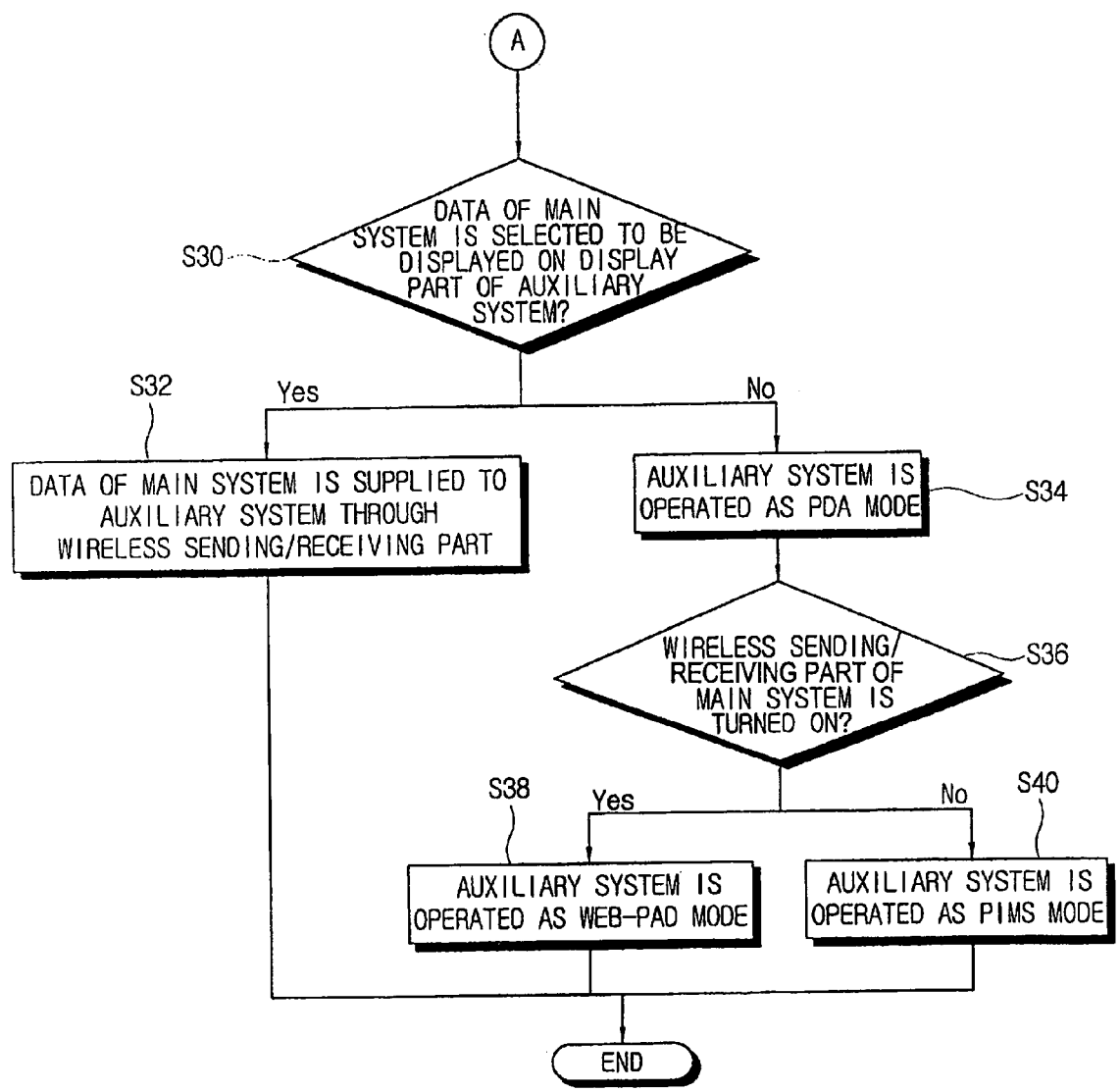

METHOD OF CONTROLLING POWER TO AN AUXILIARY SYSTEM COMPRISING A DISPLAY PART AND A WIRELESS SENDING/RECEIVING PART CONNECTED TO A PORTABLE COMPUTER THROUGH A MOUNTING PART

CROSS-REFERENCE TO RELATED APPLICATIONS

This application claims the benefit of Korean Patent Application No. 2003-44390, filed Jul. 1, 2003, in the Korean Intellectual Property Office, the disclosure of which is incorporated herein by reference.

BACKGROUND OF THE INVENTION

1. Field of the Invention

The present invention relates to a computer system and a control method thereof, and more particularly, to a computer system and a control method thereof in which data of a main system are displayed on a display part of an auxiliary system, enabling a speedy data processing even while a user is in motion.

2. Description of the Related Art

A portable computer, in contrast to a desktop computer, allows mobility and simplicity. The portable computer refers to portable computers such as a laptop computer, a notebook computer, a palmtop computer, and the like.

Under these portable computers, a PDA (Personal Digital Assistant) is used to effectively manage personal information. That is, the PDA has a function called PIMS (Personal Information Management System) to help conduct personal business, including at least a name and address database, a to-do list, and a note taker.

Further, the PDA can serve as a multimedia, being used for a computer game, a photo album, listening music and reproduction of moving picture files, and can communicate data with the desktop PC.

However, the PDA has a problem with capacity of RAM (Random Access Memory), when multimedia files are used. Further, a predetermined cable should be used with the PDA to communicate data with the desktop PC, thereby making it impossible for a user to operate the desktop PC when mobility is needed.

A notebook computer can serve also as the PDA, but it is very inconvenient to use the notebook computer as the PDA when the user is operating while in motion. For instance, the user must open a display panel of the notebook computer and boot up the notebook computer, even when the notebook computer is used only to read an e-mail and to use a multimedia file and to conduct a simple business such as PIMS, thereby causing waste of time and waste of electric power.

SUMMARY OF THE INVENTION

Accordingly, it is an aspect of the present invention to provide to a computer system and a control method thereof in which data of a main system are displayed on the display part of an auxiliary system, enabling a speedy data processing even while a user is in motion.

It is another aspect of the present invention to provide a portable computer and a control method thereof, in which the auxiliary system serves as a web-pad using a network interface of the main system or the auxiliary system serves as PIMS.

It is another aspect of the present invention to provide a portable computer and a control method the same, in which the main system is to be controlled by an input device of the auxiliary system.

Additional aspects and advantages of the invention will be set forth in part in the description which follows and, in part, will be obvious from the description, or may be learned by practice of the invention.

The foregoing and/or other aspects of the present invention are also achieved by providing a portable computer system including a data storing part; and a main system having a main display part to display data stored in the data storing part, the portable computer system further including a mounting part mounting an auxiliary system having an operating system independent of the main system and an auxiliary display part and receiving/sending data with the auxiliary system; a mounting sensing part sensing whether the auxiliary part is mounted in the mounting part and outputting a mounting sensing signal indicative thereof; a wireless sending/receiving part wirelessly sending/receiving the data with the auxiliary system; a selecting part selecting whether the data stored in the data storing part is displayed on the auxiliary display part and outputting a selection result indicative thereof; and a control part supplying the data stored in the data storing part to the auxiliary system through the mounting part or the wireless sending/receiving part, according to the mounting sensing signal and the selection result.

According to an aspect of the invention, the portable computer system further comprises a charging part supplying charged electric power to a first battery of the main system; and a switching part supplying/cutting-off the electric power charged to a second battery of the auxiliary system, wherein the control part controls the switching part to supply the electric power charged to the battery of the auxiliary system through the mounting part, based on the mounting sensing signal.

According to an aspect of the invention, the mounting part further includes a power supplying port to supply electric power charged in the charging part to the battery of the auxiliary system.

According to an aspect of the invention, the mounting part further includes a DVO (Digital Video Output) port.

According to an aspect of the invention, the control part supplies a PDA (Personal Digital Assistant) mode operating signal to the auxiliary system and through the wireless sending/receiving part, based on the mounting sensing signal indicating that the auxiliary system is not mounted and the selection result indicating that the data is not selected to be displayed.

According to an aspect of the invention, an embedded controller in the auxiliary system determines whether the wireless sending/receiving part of the main system is turned on/off and controls the auxiliary system to serve as a web-pad mode through the wireless sending/receiving part according to a user input in the auxiliary system, if determined that the wireless sending/receiving part of the main system is turned on.

According to an aspect of the invention, the embedded controller of the auxiliary system determines whether the wireless sending/receiving part of the main system is turned on/off and controls the auxiliary system to serve as a PIMS mode according to the user input in the auxiliary system, if determined that the wireless sending/receiving part of the main system is turned off.

According to an aspect of the invention, the control part supplies a signal to cut off electric power to the auxiliary system through one of the mounting part and the wireless sending/receiving part, based on the mounting sensing signal indicating that the auxiliary system is mounted and the selection result indicating that the data is not selected to be displayed.

According to an aspect of the invention, the user input signal in the auxiliary system is transmitted to the control part through the wireless sending/receiving part.

According to an aspect of the present invention, there is provided a portable computer system, including: an auxiliary system including a display part, and a first wireless sending/receiving part; and a main system including a display panel, a data storing part storing data, a second wireless sending/receiving part, a mounting part mounting the auxiliary system thereto, a mounting sensing part sensing whether the auxiliary system is mounted on the mounting part, and a switching part supplying electric power to the auxiliary system when the mounting sensing part senses that the auxiliary system is mounted on the mounting part, wherein data of the main system is supplied to the auxiliary system wirelessly, through the first and second wireless sending/receiving parts, or through the mounting part, when displaying the data of the main system on the display part of the auxiliary system, the main system transmits the data stored in the data storing part to the auxiliary system to process and to display the data of the main system on the display part, and when not displaying the data of the main system on the display part, the main system supplies a signal to the switching part to cut-off the electric power to the auxiliary system through the mounting part or the first wireless sending/receiving part.

According to an aspect of the present invention, there is provided a portable computer, including: an auxiliary system including a first wireless sending/receiving part and a display part; a second wireless sending/receiving part; and a mounting part on a side of a casing to mount the auxiliary system, wherein data of the main system is supplied to the auxiliary system wirelessly, through the first and second wireless sending/receiving parts, or through the mounting part.

According to an aspect of the present invention, there is provided a method of controlling a portable computer system which includes an auxiliary system, which includes a display part and a first wireless sending/receiving part, and a main system, which includes a display panel, a second wireless sending/receiving part, a mounting part mounting the auxiliary system thereto, the method including: allowing wireless communication between the main system and the auxiliary system through the wireless sending/receiving part; determining whether the auxiliary system is mounted on a mounting part of the main system; supplying electric power to the auxiliary system when mounted on the main system; transmitting the data stored in the main system to the auxiliary system to process and to display the data of the main system on the display part when a user selects to display the data on the display part; and cutting-off the electric power to the auxiliary system through the mounting part or the first wireless sending/receiving part when the user selects not to display the data of the main system on the display part.

According to an aspect of the present invention, there is provided a portable computer capable of receiving an auxiliary system including a first wireless sending/receiving part and a display part, the portable computer including: a second wireless sending/receiving part; a mounting part on a side of a casing to receive the auxiliary system; a selecting part selecting whether the data of the main system is displayed on the display part; and a controller reading data of the main system and transmitting the data to the auxiliary system when displaying the data of the main system on the display part, or supplying an operating signal of a PDA (Personal Digital Assistant) mode to the auxiliary system when not displaying the data of the main system on the display part, wherein data of the main system is supplied to the auxiliary system wirelessly, through the first and second wireless sending/receiving parts, or through the mounting part.

According to an aspect of the present invention, there is provided a portable computer system, including: an auxiliary system including a display part and an embedded controller; and a main system including a display panel, a data storing part storing data, a mounting part mounting the auxiliary system thereto, a mounting sensing part sensing whether the auxiliary system is mounted on the mounting part, and a switching part supplying electric power to the auxiliary system when the mounting sensing part senses that the auxiliary system is mounted on the mounting part, wherein the embedded controller controls the auxiliary system to serve as a web pad mode or to operate in a PIMS mode according to whether the second wireless sending/receiving part of the main system is turned on.

According to an aspect of the present invention, there is provided a computer readable storage medium controlling a computer and including a process of controlling a portable computer system which includes an auxiliary system, which includes a display part and a first wireless sending/receiving part, and a main system, which includes a display panel, a second wireless sending/receiving part, a mounting part mounting the auxiliary system thereto, the process including: allowing wireless communication between the main system and the auxiliary system through the wireless sending/receiving part; determining whether the auxiliary system is mounted on a mounting part of the main system; supplying electric power to the auxiliary system when mounted on the main system; transmitting the data stored in the main system to the auxiliary system to process and to display the data of the main system on the display part when a user selects to display the data on the display part; and cutting-off the electric power to the auxiliary system through the mounting part or the first wireless sending/receiving part when the user selects not to display the data of the main system on the display part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 5 is a control flow chart of the portable computer system, according to another aspect of the present invention.

DETAILED DESCRIPTION OF THE PREFERRED EMBODIMENTS

Figure 1:
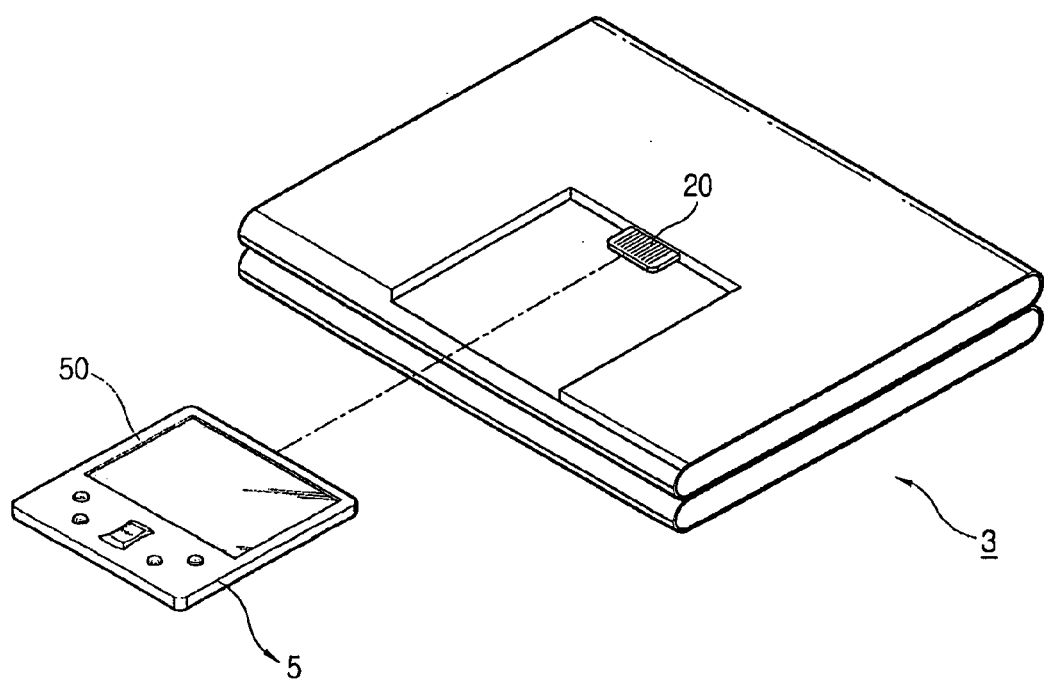
FIG. 1 is a perspective view of a portable computer system, according to an aspect of the present invention.

Reference will now be made in detail to the aspects of the present invention, examples of which are illustrated in the accompanying drawings, wherein like reference numerals refer to like elements throughout. The aspects are described below in order to explain the present invention by referring to the figures.

FIG. 1 is a perspective view of a portable computer system, according to an aspect of the present invention. As shown in FIG. 1, the portable computer is provided on a side of a casing with a mounting part 20 to mount an auxiliary system 5 therein. Thus, the auxiliary system 5 is to be carried with the portable computer.

Here, the auxiliary system 5 may be an embedded system having an operating system independent of a main system 3 of the portable computer and may include memory, a battery, a display part 50 and the like.

Figure 2:
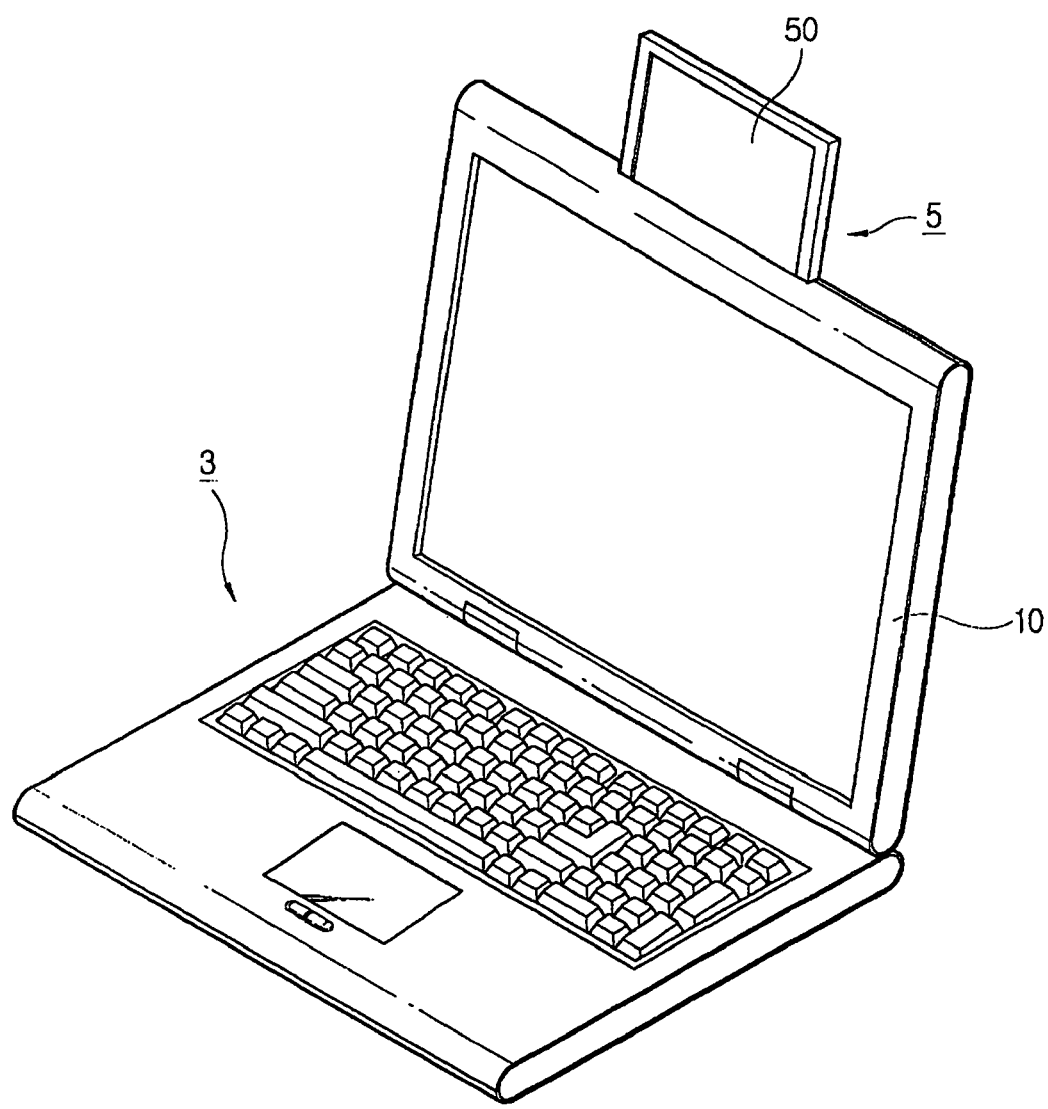
FIG. 2 is a perspective view of the portable computer system, according to another aspect the present invention.

As shown in FIG. 2, the mounting part 20 may be provided so that the display part 50 of the auxiliary system 5 protrudes from an upper part of a display panel 10. Otherwise, the mounting part 20 may be rotated.

The display part 50 of the auxiliary system 5 may display an operating panel of a multimedia file when the display panel 10 is opened, i.e., may serve as an additional display part of the main system 3.

Figure 3:
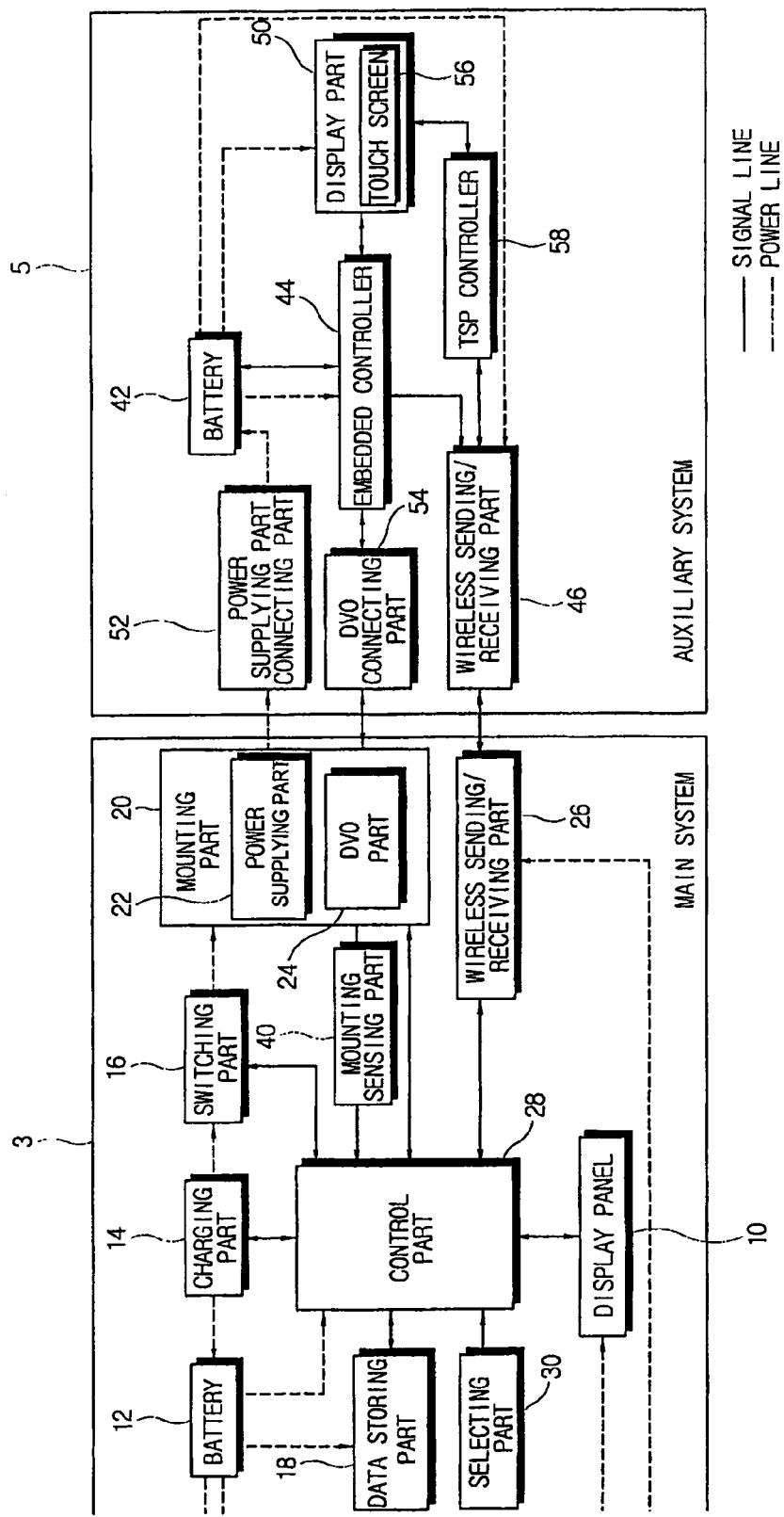
FIG. 3 is a control block diagram of the portable computer system, according to an aspect of the present invention.

FIG. 3 is a control block diagram of the portable computer system, according to an aspect of the present invention. As shown herein, the portable computer system has a main system 3 including a battery 12, a charging part 14 to charge the battery 12, a data storing part 18, a display panel 10, and the mounting part 20 to mount the auxiliary system 5 thereto and to send/receive data to/from the auxiliary system 5. A mounting sensing part 40 in the main system 3 senses whether the auxiliary system 5 is mounted on the mounting part 20 of the main system 3, a wireless sending/receiving part 26 wirelessly communicates with the auxiliary system 5, a selecting part 30 selects whether the data in the data storing part 18 is displayed on the display part 50 of the auxiliary system 5, and a switching part 16 supplies/cuts-off electric power of the charging part 14 to the auxiliary system 5. A control part 28 in the main system 3 controls the portable computer system.

The auxiliary system 5 includes a battery 42 to supply the electric power, the display part 50 to display data and to be employed as a touch screen 56, a TSP (Touch Screen Panel) controller 58 to process a user input-signal through the touch screen 56 of the display part 50, a wireless sending/receiving part 46 to wirelessly communicate with the main system 3, and an embedded controller 44 to generally control the auxiliary system 5.

The battery 12 supplies the electric power to operate components of the portable computer. The control part 28 controls a supply of the electric power charged by the charging part 14 to the battery 12, based on a remaining capacity sensing signal of a sensing part to determine a remaining capacity of the battery 12.

The auxiliary system 5 is mounted on the mounting part 20, and the mounting part 20 may include a DVO (Digital Video Output) port 24 and a power supplying port 22. In the auxiliary system 5 are provided a DVO port connecting part 54 and a power supplying port connecting part 52 connected to the DVO (Digital Video Output) port 24 and the power supplying port 22.

The mounting sensing part 40 includes a circuit to generate an electric signal, when the auxiliary system 5 is mounted on the mounting part 20 of the main system 3. The mounting sensing part 40 generates two different signals according to whether the auxiliary system 5 is mounted on the main system 3 and supplies the signals to the control part 28.

The wireless sending/receiving part 26 of the main system 3 and the wireless sending/receiving part 46 of the auxiliary system 5 may be Blue Tooth, or any type of UWB (ultra wideband) interfaces. Through the wireless sending/receiving parts 26 and 46, the main system 3 and the auxiliary system 5, respectively, can be wirelessly communicated. Further, through the wireless sending/receiving part 26, the main system 3 can be connected to web-servers and serve as a web-browser.

In an aspect of the present invention, the wireless sending/receiving part 46 of the auxiliary part 5 is provided only to communicate the data between the auxiliary part 5 and the main system 3, so that the auxiliary system 5 cannot be connected to web-servers through the wireless sending/receiving part 46 of the auxiliary system 5. The auxiliary system 5 can serve as a web-browser only through the wireless sending/receiving part 26 of the main system 3.

Different from the aspect described above, the auxiliary system 5 may be constructed so that the auxiliary system 5 can be connected to web-servers through the wireless sending/receiving part 46 of the auxiliary system 5 and serve as a stand-alone web-browser.

The selecting part 30 selects whether the data of the main system 3 is displayed on the display part 50 of the auxiliary system 5 or on the display panel of the main system 3 and may be provided in a form of a predetermined button, a hot key, or a selecting program.

The selecting program may be implemented where, if the switch of the auxiliary system 3 is turned on and a power supplying signal is transmitted from the auxiliary system 3 through the mounting part 20 or the wireless sending/receiving part 26 to the main system 3, the control part 28 of the main system 3 senses the power supplying signal and controls to operate the selecting program.

The switching part 16 is electrically connected to the charging part 14 and the power supplying port 22 of the mounting part 20 to supply/cut-off the electric power charged in the charging part 14 to the auxiliary system 5 and through the power supplying port 22.

The control part 28 determines whether the auxiliary system 5 is mounted based on a mounting sensing signal generated from the mounting sensing part 40. If determined that the auxiliary system 5 is mounted, the control part 28 turns on the switching part 16, so that the electric power charged in the charging part 14 is supplied to the battery 42 of the auxiliary system 5 through the power supplying port 22.

If the user selects to display the data of the main system 3 on the display part 50 of the auxiliary system 5, the control part 28 transmits the data stored in the data storing part 18 to the auxiliary system 5 through the DVO port 24. Then, the embedded controller 44, storing a graphic controller of the auxiliary system 5, processes the data of the main system 3 transmitted through the DVO port 24 in the signal processing part (not shown) and displays the data of the main system 3 on the display part 50.

If the user selects not to display data of the main system 3 on the display part 50 of the auxiliary system 5, the control part 28 supplies a signal to cut-off power to the auxiliary system 5 through one of the mounting part 20 and the wireless sending/receiving part 26.

The embedded controller 44 of the auxiliary system 5 controls the battery 42 according to the signal to cut-off power and turns-off the electric power of the display part 50 of the auxiliary system 5, thereby reducing unnecessary power consumption when the user does not want to display data on the display part 50 of the auxiliary system 5.

If determined that the auxiliary system 5 is not mounted, the control part 28 turns-off the switching part 16 and stops charging the battery 42 of auxiliary system 5, thereby preventing a current leakage to the charging part 14.

If the user selects to display data of the main system 3 on the display part 50 of the auxiliary system 5, the control part 28 reads the data stored in the data storing part 18 and transmits the data to the auxiliary system 5 through the wireless sending/receiving part 26.

If the user selects not to display data of the main system 3 on the display part 50 of the auxiliary system 5, the control part 28 supplies an operating signal of a PDA (Personal Digital Assistant) mode to the auxiliary system 5 through the wireless sending/receiving part 26.

The embedded controller 44 of the auxiliary system 5 to which the operating signal of the PDA mode is supplied determines whether the wireless sending/receiving part 26 of the main system 3 is turned on/off. If determined that the wireless sending/receiving part 26 of the main system 3 is turned on, the embedded controller 44 controls the auxiliary system 5 to serve as a web-pad mode, such as the web-browser, through the wireless sending/receiving part 26, according to an input through the touch screen 56 of the auxiliary system 5.

If determined that the wireless sending/receiving part 26 of the main system 3 is turned off, the embedded controller 44 controls the auxiliary system 5 to operate in the PIMS mode. Here, the auxiliary system 5 can serve in the PIMS mode.

Thus, the data of the main system 3 can be displayed on the display part 50 of the auxiliary system 5 without opening the portable computer, so that the data can be speedily processed even while the user is in motion and the auxiliary system 5 can be used as a web-pad through the wireless sending/receiving part 26. The auxiliary system 5 can be operated in the PIMS mode such as data recording, reproducing, and displaying machines.

An input signal through the touch screen 56 of the auxiliary system 5 is controlled by the TSP controller 58 and then transmitted to the control part 28 of the main system 3 through the wireless sending/receiving part 26 and 46, thereby enabling to control the main system 3 through the touch screen 56, i.e., the input device of the auxiliary system 5.

Herein, the input device of the auxiliary system 5 is described as the touch screen 56, but it is not limited thereto.

Figure 4:
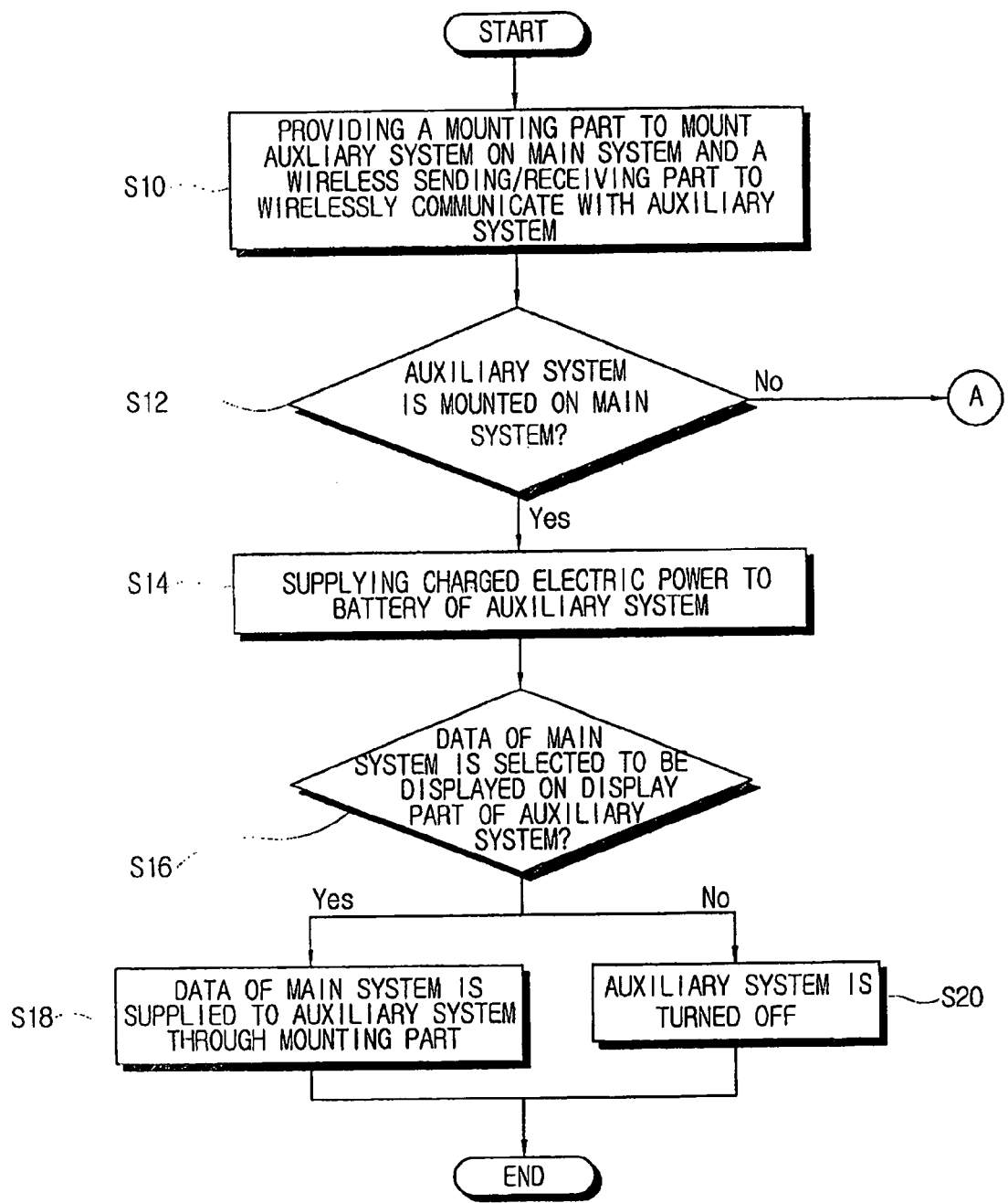
FIG. 4 is a control flow chart of the portable computer system, according to an aspect of the present invention.

With the above configuration, a control flow according to an aspect of the present invention is illustrated in FIG. 4. At operation S10, the mounting part 20, to mount the auxiliary system 5 therein, and the wireless sending/receiving part 26, to wirelessly communicate with the auxiliary system 5, are provided in the main system 3. At operation S12, the control part 28 determines whether the auxiliary system 5 is mounted on the main system 3 based on the sensed result through the mounting sensing part 40. At operation S14, if determined that the auxiliary system 5 is mounted on the main system 3, the control part 28 controls the charging part 14 to supply the charged electric power to the battery 42 of the auxiliary system 5. At operation S16, if the user selects, through the selecting part 30, to display the data of the main system 3 on the display part 50 of the auxiliary part 5, at operation S18, the control part 28 controls to supply the data stored in the data storing part 18 to the auxiliary system 5 through the mounting part 20. At operation S16, if the user selects not to display the data of the main system 3 on the display part 50 of the auxiliary part 5, the control part 28 controls the embedded controller 44 to cut-off electric power of the auxiliary system 5 through the wireless sending/receiving part 26 or the mounting part 20. Then, at operation S20, the embedded controller controls the battery 42 to cut off electric power of the auxiliary system 5.

A control flow is illustrated in FIG. 5, when the auxiliary system 5 is not mounted on the main system 3. As shown herein, at operation S30, if the user selects to display the data of the main system 3 on the display part 50 of the auxiliary system 5, at operation S32, the control part 28 reads the data stored in the data storing part 18 and supplies the data to the auxiliary system 5 through the wireless sending/receiving part 26. Therefore, the data of the main system 3 is displayed on the display part 50 of the auxiliary system 5.

In contrast, at operation S30, if the user selects not to display the data of the main system 3 on the display part 50 of the auxiliary system 5, at operation S34, the control part 28 supplies a PDA operating mode signal to the embedded controller 44 through the wireless sending/receiving part 26 and controls to operate the auxiliary system 5 in the PDA mode.

Subsequently, at operation S36, the embedded controller 44 determines whether the wireless sending/receiving part 26 of the main system 3 is turned on/off. If determined that the wireless sending/receiving part 26 of the main system 3 is turned on, at operation S38, the embedded controller 44 controls the auxiliary system 5 to operate in the web-pad mode. If determined that the wireless sending/receiving part 26 of the main system 3 is turned off, at operation S40, the embedded controller 44 controls the auxiliary system 5 to operate in the PIMS mode.

In the embodiment described above, the data of the main system 3 are supplied to the auxiliary system 5 through the mounting part 20, when the auxiliary system 5 is mounted on the main system 3. However, according to an alternative aspect of the present invention, the auxiliary system 5 and the main system 3 may be connected through a predetermined cable, thereby enabling sending/receiving of data between the auxiliary system 5 and the main system 3.

In the aspect described above, the auxiliary system 5 is operated in the PIMS mode S40, under a condition that the auxiliary system 5 is not mounted on the main system 3, the user selects not to display the data of the main system 3 on the display part 50 of the auxiliary system 5, and the wireless sending/receiving part 26 of the main system 3 is turned off. However, in an alternative aspect of the present invention, the web-pad mode may be automatically transformed to the PIMS mode through a user setting, if the auxiliary system 5 is not mounted on the main system 3.

According to an aspect of the present invention, the data of the main system 3 is supplied to the auxiliary system 5 through the mounting part 20 or the wireless sending/receiving part 26, regardless of whether the auxiliary system 5 is mounted on the main system 3 or not, thereby enabling a speedy data processing even while the user is in motion.

As described above, the present invention provides a portable computer and a control method thereof, in which data of a main system are displayed on a display part of an auxiliary system, thereby enabling a speedy data processing even while a user is in motion.

Further, the present invention provides a portable computer and a control method thereof, in which an auxiliary system serves as a web-pad using a network interface of a main system or the auxiliary system operates in a PIMS mode.

Moreover, the present invention provides a portable computer and a control method thereof, in which a main system is to be controlled using an input device of an auxiliary system.

The portable computer system implementing the method described above includes permanent or removable storage, such as an application specific integrated circuit (ASIC), magnetic and optical discs, RAM, ROM, etc. on which the process and data structures of the present invention can be stored and distributed. The processes can also be distributed via, for example, downloading over a network such as the Internet.

Although a few aspects of the present invention have been shown and described, it will be appreciated by those skilled in the art that changes may be made in these aspects without departing from the principles and spirit of the invention, the scope of which is defined in the appended claims and their equivalents.

What is claimed is:

1. A portable computer system, comprising:
   an auxiliary system comprising
      a display part, and
      a first wireless sending/receiving part; and
   a main system comprising
      a display panel,
      a data storing part storing data,
      a second wireless sending/receiving part,
      a mounting part mounting the auxiliary system thereto,
      a mounting sensing part sensing whether the auxiliary system is mounted on the mounting part, and
      a switching part supplying electric power to the auxiliary system when the mounting sensing part senses that the auxiliary system is mounted on the mounting part, wherein
      data of the main system is supplied to the auxiliary system wirelessly, through the first and second wireless sending/receiving parts, or through the mounting part,
      when displaying the data of the main system on the display part of the auxiliary system, the main system transmits the data stored in the data storing part to the auxiliary system to process and to display the data of the main system on the display part, and
      when not displaying the data of the main system on the display part, the main system supplies a signal to the switching part to cut-off the electric power to the auxiliary system through the mounting part or the main system supplies the signal to the auxiliary system through the first and second wireless sending/receiving parts to cut-off electric power.

2. The portable computer system as recited in claim 1, wherein the auxiliary system is connected to web-servers through the first wireless sending/receiving part or the second wireless sending/receiving part.

3. The portable computer system as recited in claim 1, wherein the auxiliary system further comprises:
   a battery, and
   an embedded controller controlling the battery of the auxiliary system according to the signal from the main system to cut-off the electric power and turns-off the electric power of the display part to reduce unnecessary power consumption when not displaying the data on the display part.

4. The portable computer system as recited in claim 3, wherein the main system further comprises:
   a charging part, and
   a control part reading the data stored in the data storing part and transmitting the data to the auxiliary system through the second wireless sending/receiving part when displaying the data of the main system on the display part, or supplying an operating signal of a PDA (Personal Digital Assistant) mode to the auxiliary system through the second wireless sending/receiving part when not displaying the data of the main system on the display part.

5. The portable computer system as recited in claim 4, wherein, when sensing that the auxiliary system is not mounted, the main system turns-off the switching part and stops charging the battery of auxiliary system to prevent a current leakage to the charging part.

6. The portable computer system as recited in claim 3, wherein display part of the auxiliary system comprises:
   a TSP (Touch Screen Panel) screen receiving a user input-signal, and
   a TSP controller to process the user input-signal through the touch screen, wherein when the embedded controller determines that the second wireless sending/receiving part of the main system is turned on, the embedded controller controls the auxiliary system to serve as a web-pad mode, according to the user input-signal.

7. The portable computer system as recited in claim 3, wherein when the embedded controller determines that the second wireless sending/receiving part of the main system is turned off, the embedded controller controls the auxiliary system to operate in a PIMS (Personal Information Management System) mode.

8. The portable computer system as recited in claim 4, wherein the auxiliary system further comprises:
   a DVO (Digital Video Output) port connecting part, and
   a power supplying port connecting part connected to the DVO port and the power supplying port.

9. The portable computer system as recited in claim 1, wherein the second wireless sending/receiving part of the main system and the first wireless sending/receiving part of the auxiliary system each comprises Blue Tooth or a UWB (ultra wideband) interface.

10. The portable computer system as recited in claim 4, wherein the mounting sensing part generates an electric signal when the auxiliary system is mounted on the mounting part of the main system and supplies the signal to the control part.

11. The portable computer system as recited in claim 1, wherein the auxiliary system provides wireless access to the main system to web-servers and the auxiliary system serves as a web-browser for the main system.

12. The portable computer system as recited in claim 1, wherein the auxiliary system is connected to web-servers through the first wireless sending/receiving part of the auxiliary system to serve as a stand-alone web-browser.

13. The portable computer system as recited in claim 8, wherein the switching part is electrically connected to the charging part and the power supplying port of the mounting part to supply/cut-off the electric power charged in the charging part to the auxiliary system and through the power supplying port.

14. The portable computer system as recited in claim 1, wherein the main system further comprises:

a selecting part selecting whether the data in the data storing part is displayed on the display part of the auxiliary system or on the display panel of the main system.

15. The portable computer system as recited in claim 14, wherein the selecting part comprises a predetermined button, a hot key, or a selecting program, where if the auxiliary system is mounted on the mounting part and is turned on, and a power supplying signal is transmitted from the auxiliary system through the mounting part or the second wireless sending/receiving part to the main system, the main system senses the power supplying signal and operates the selecting program.

16. The portable computer system as recited in claim 4, wherein the control part determines whether the auxiliary system is mounted based on a mounting sensing signal generated from the mounting sensing part.

17. A portable computer, comprising:
an auxiliary system comprising a first wireless sending/receiving part and a display part;
a second wireless sending/receiving part;
a switching part; and
a mounting part on a side of a casing to mount the auxiliary system and connected to the switching part, wherein data of a main system is supplied to the auxiliary system wirelessly, through the first and second wireless sending/receiving parts or through the mounting part to be displayed on the display part,
wherein when not displaying the data of the main system on the display part, the main system supplies a signal to the switching part to cut-off the electric power to the auxiliary system through the mounting part or the main system supplies the signal to the auxiliary system through the first and second wireless sending/receiving parts to cut-off electric power.

18. The portable computer as recited in claim 17, further comprising:
a display panel, wherein the display part of the auxiliary system displays an operating panel of a multimedia file when the display panel is opened to serve as an additional display part of the portable computer.

19. The portable computer as recited in claim 17, wherein the auxiliary system is an embedded controller having an operating system independent of the portable computer.

20. The portable computer as recited in claim 19, wherein the embedded controller controls the auxiliary system to serve as a web-pad mode or to operate in a PIMS mode according to whether the second wireless sending/receiving part of the main system is turned on.

21. The portable computer as recited in claim 17, wherein the auxiliary system and the main system are connected through a predetermined cable to send/receive data between the auxiliary system and the main system.

22. A method of controlling a portable computer system comprising an auxiliary system comprising a display part and a first wireless sending/receiving part, and a main system comprising a display panel, a second wireless sending/receiving part, a mounting part mounting the auxiliary system thereto, the method comprising:
allowing wireless communication between the main system and the auxiliary system through the first and second wireless sending/receiving parts;
determining whether the auxiliary system is mounted on a mounting part of the main system;
supplying electric power to the auxiliary system when mounted on the main system;
transmitting the data stored in the main system to the auxiliary system to process and to display the data of the main system on the display part when a user selects to display the data on the display part; and
cutting-off the electric power to the auxiliary system through the mounting part or the first and second wireless sending/receiving parts when the user selects not to display the data of the main system on the display part.

23. The method as recited in claim 22, when the user selects to display the data of the main system on the display part of the auxiliary system, the main system reads the data stored therein and supplies the data to the auxiliary system through the second wireless sending/receiving part.

24. The method as recited in claim 22, when the user selects not to display the data of the main system on the display part of the auxiliary system, the main system supplies a PDA (Personal Digital Assistant) operating mode signal to the auxiliary system through the second wireless sending/receiving part and controls to operate the auxiliary system in the PDA mode.

25. The method as recited in claim 22, further comprising:
determining whether the second wireless sending/receiving part of the main system is turned on/off.

26. The method as recited in claim 25, the method further comprising:
controlling the auxiliary system to operate in a web-pad mode when the second wireless sending/receiving part is turned on and the auxiliary system is mounted on the mounting part of the main system.

27. The method as recited in claim 25, the method further comprising:
controlling the auxiliary system to operate in a PIMS (Personal Information Management System) mode when the second wireless sending/receiving part is turned off and the auxiliary system is not mounted on the mounting part of the main system.

28. The method as recited in claim 25, the method further comprising:
automatically transforming a web-pad mode to a PIMS (Personal Information Management System) mode through a user setting when the auxiliary system is not mounted on the mounting part of the main system.

29. A portable computer capable of receiving an auxiliary system comprising a first wireless sending/receiving part and a display part, the portable computer comprising:
a second wireless sending/receiving part;
a mounting part on a side of a casing to receive the auxiliary system;
a selecting part selecting whether data of a main system is to be displayed on the display part; and
a controller reading data of the main system and transmitting the data to the auxiliary system when displaying the data of the main system on the display part, or supplying an operating signal of a PDA (Personal Digital Assistant) mode to the auxiliary system when not displaying the data of the main system on the display part,
wherein data of the main system is supplied to the auxiliary system wirelessly, through the first and second wireless sending/receiving parts, or through the mounting part, and
wherein when not displaying the data of the main system on the display part, the main system supplies a signal to the auxiliary system through the mounting part or the first and second wireless sending/receiving parts to cut-off electric power.

30. A portable computer system, comprising:
an auxiliary system comprising a display part, a first wireless sending/receiving part, and an embedded controller; and
a main system comprising
   a display panel,
   a second wireless sending/receiving part,
   a data storing part storing data,
   a mounting part mounting the auxiliary system thereto,
   a mounting sensing part sensing whether the auxiliary system is mounted on the mounting part, and
   a switching part supplying electric power to the auxiliary system when the mounting sensing part senses that the auxiliary system is mounted on the mounting part, wherein the embedded controller controls the auxiliary system to serve as a web pad mode or to operate in a PIMS mode according to whether the second wireless sending/receiving part of the main system is turned on,
   wherein when not displaying the data of the main system on the display part, the main system supplies a signal to the switching part to cut-off the electric power to the auxiliary system through the mounting part or the main system supplies the signal to the auxiliary system through the first and second wireless sending/receiving parts to cut-off electric power.

31. A computer readable storage medium controlling a computer and comprising a process of controlling a portable computer system which comprises an auxiliary system, which comprises a display part and a first wireless sending/receiving part, and a main system, which comprises a display panel, a second wireless sending/receiving part, a mounting part mounting the auxiliary system thereto, the process comprising:
   allowing wireless communication between the main system and the auxiliary system through the first and second wireless sending/receiving part;
   determining whether the auxiliary system is mounted on a mounting part of the main system;
   supplying electric power to the auxiliary system when mounted on the main system;
   transmitting the data stored in the main system to the auxiliary system to process and to display the data of the main system on the display part when a user selects to display the data on the display part; and
   cutting-off the electric power to the auxiliary system through the mounting part or the first and second wireless sending/receiving parts when the user selects not to display the data of the main system on the display part.

* * * * *